US005789527A

United States Patent [19]

Nakamichi et al.

[11] Patent Number: 5,789,527

[45] Date of Patent: Aug. 4, 1998

[54] POLYESTER RESIN FOR USE IN TONER BINDER AND PROCESS FOR PRODUCING THE SAME

[75] Inventors: Kikumi Nakamichi; Kouta Tanahashi; Tomoko Kubota; Naomi Sasaki, all of Uji; Hideki Kurebayashi; Haruo Okutani, both of Shizuoka; Kazue Nakadera, Shizuoka, all of Japan

[73] Assignees: Tomoegawa Paper Co., Ltd., Tokyo; Unitika, Ltd., Hyogo, both of Japan

[21] Appl. No.: 604,987

[22] PCT Filed: Jul. 17, 1995

[86] PCT No.: PCT/JP95/01422

§ 371 Date: Jun. 5, 1996

§ 102(e) Date: Jun. 5, 1996

[87] PCT Pub. No.: WO96/02869

PCT Pub. Date: Feb. 1, 1996

[30] Foreign Application Priority Data

| | | | |
|---|---|---|---|
| Jul. 18, 1994 | [JP] | Japan | 6-164438 |
| Oct. 21, 1994 | [JP] | Japan | 6-282644 |

[51] Int. Cl.$^6$ .................. C08G 63/02

[52] U.S. Cl. .................. 528/272; 430/31; 524/824; 525/437; 526/78; 528/279; 528/283; 528/296; 528/297

[58] Field of Search .................. 525/437; 523/500, 523/512; 430/31; 524/824; 526/78, 86, 227, 321; 528/272, 279, 283, 296, 297, 298, 299, 300, 301, 302, 306, 307, 308

[56] References Cited

FOREIGN PATENT DOCUMENTS

| | | |
|---|---|---|
| A-60-263950 | 12/1985 | Japan . |
| A-62-295068 | 12/1987 | Japan . |
| A-63-109447 | 5/1988 | Japan . |
| A-3-188468 | 8/1991 | Japan . |
| A-3-203748 | 9/1991 | Japan . |

OTHER PUBLICATIONS

International Search Report dated Jul. 26, 1995 and mailed Aug. 15, 1995.

*Primary Examiner*—Terressa Mosley
*Attorney, Agent, or Firm*—Barnes, Kisselle, Raisch, Choate, Whittemore & Hulbert, P.C.

[57] ABSTRACT

Provided are a polyester resin for use in a toner binder which is excellent in terms of offset resistance and low-temperature fixability, which keeps triboelectric charge stability even in an environment of a high temperature and a high humidity, which has excellent durability, and which is used in a toner that gives vivid image characteristics, a process for producing the same, and a toner using the same. The polyester resin for use in the toner binder is formed by linking at least a part of the crosslinked low-molecular polyesters through a dicarboxylic acid used as a linking agent.

10 Claims, No Drawings

POLYESTER RESIN FOR USE IN TONER BINDER AND PROCESS FOR PRODUCING THE SAME

FIELD OF THE INVENTION

The present invention relates to a polyester resin for use in a toner binder which is appropriate as a toner for developing an electrostatic image that is used in the field of electrophotography, electrostatic recording, electostatic printing or the like, to a process for producing the same, and to a toner using the same.

BACKGROUND OF THE INVENTION

The conventional electrophotography comprises, as described in the specifications of U.S. Pat. Nos. 2,297,691 and 2,357,809, a step of forming an electrostatic latent image on the surface of a roller made of a photoconductive insulator and developing this latent image as a toner image using a dry developer formed of colored fine particles, a step of transferring the thus-obtained toner image onto a transfer sheet such as paper or the like, and a step of permanently fixing the transferred image through heating, pressuring or the like.

Recently, a higher speed, a smaller size and energy saving have been required in a copier. In order to meet these requirements, a fixing step is preferably conducted using a heating roller which has excellent thermal efficiency, which has a compact mechanism and which allows a higher speed operation.

However, since the surface of the heating roller is brought into contact with the surface of the toner image in this heating roller fixing method, a so-called offset phenomenon occurs in which the toner is transferred onto the surface of the heating roller and then onto a paper, causing a next paper to be stained with the toner image.

In order to prevent such an offset phenomenon, Japanese Patent Publication No. 23,354/1976 proposed that a crosslinking styrenic resin is used as a resin for use in a toner binder. Since then, various improvements have been conducted, and a styrene-acrylate ester copolymer has been mainly used as a resin for use in a toner binder.

Meanwhile, recently, it has been found that a polyester resin is superior to the conventional styrene-acrylate ester copolymer in that the former allows the fixing at a lower temperature, is excellent in terms of durability to vinylchloride plasticizers, and can be applied to coloring for its excellent transparency. Thus, the polyester resin has attracted attention as a resin for use in a toner binder.

Generally, a polyester resin is produced by a condensation reaction between a dicarboxylic acid and/or its lower alkyl ester and a dihydric alcohol. When the thus-obtained polyester resin consisting only of a linear component is used as a toner binder, the offset resistance is very poor, making it impossible to obtain a good transferred image.

Therefore, as a means for decreasing the offset phenomenon when a polyester resin is used as a toner binder, it was proposed in Japanese Laid-Open Unexamined Patent Application Nos. 75,043/1975, 86,342/1979 and 195,680/1987 that polyester resins having a three-dimensional network structure obtained by copolymerizing a tricarboxylic acid and/or a trihydric alcohol are used as toner binders.

However, when a tricarboxylic or polycarboxylic acid and/or a trihydric or polyhydric alcohol is copolymerized as mentioned above, a crosslinking reaction abruptly proceeds in the condensation reaction step for crosslinking. As a result, the reaction product undergoes gelation at times and cannot be discharged from the reaction vessel. Further, when the product has an excessively crosslinked structure, the flowability of the resin decreases, impairing the fixability at a low temperature which is an inherent property of polyester resins.

In order to solve this problem, first, Japanese Laid-Open Unexamined Patent Application No. 54,574/1991 discloses a method in which a reaction temperature and a degree of vacuum on reaction are controlled to suppress the abrupt gelation. However, it substantially involves problems in which the viscosity of the polymer excessively increases owing to the distillation of low-boiling components formed by the transesterification reaction, making it impossible to obtain a resin having a desired degree of crosslinking, and so forth.

Second, Japanese Laid-Open Unexamined Patent Application No. 225,520/1990 discloses a method in which a linear or branched low-molecular polyester having a number average molecular weight (Mn) of from 300 to 1,400 is copolymerized with a trivalent or higher component for crosslinking. However, the abrupt increase in the viscosity of the polymer is still unescapable in this method, and a stable crosslinked polyester resin is hard to produce.

Third, Japanese Laid-Open Unexamined Patent Application No. 45,622/1987 proposes a method in which the degree of crosslinking of a polyester resin is controlled by containing a monocarboxylic acid in the polyester resin. In this method, a polyester resin having offset resistance is obtained but a large amount of residual carboxyl groups is present. Therefore, the amount of electrostatic charge on the toner which is obtained from this polyester resin comes to vary greatly depending on the environment (temperature and humidity), posing a problem in which an excellent transferred image can hardly be obtained.

As stated above, although a polyester resin material is deemed appropriate as a toner binder, a polyester resin for use in a toner binder which eliminates the above-mentioned problems and which has offset resistance, low-temperature fixability and triboelectric charge stability has not yet been obtained.

Accordingly, the present invention aims to provide a polyester resin for use in a toner binder which is excellent in terms of offset resistance and low-temperature fixability, which retains triboelectric charge stability even in an environment with high temperature and high humidity, which has excellent durability, and which is used in a toner that gives vivid image characteristics, as well as a toner using the same.

DISCLOSURE OF THE INVENTION

The present inventors have conducted assiduous studies to solve the above-mentioned problems, and have consequently found that a polyester resin which is formed by linking crosslinked low-molecular polyesters obtained by polycondensing a dicarboxylic acid component, a dihydric alcohol component, a tricarboxylic or polycarboxylic acid component having more than three carboxylic groups and a trihydric or polydydric alcohol component having more than three hydroxyl groups through a dicarboxylic acid has excellent properties in terms of offset resistance, low-temperature fixability and triboelectric charge stability. This finding has led to the completion of the present invention. That is, the present invention comprises the following constructions 1 to 4.

1. A polyester resin for use in a toner binder, characterized in that at least a part of a crosslinked low-molecular polyester having an acid value of 5 mg KOH/g or less, a number average molecular weight (Mn) of 2,000 or less and a ratio of weight average molecular weight (Mw) to number average molecular weight (Mn) (Mw/Mn) of 2.5 or more is linked through a dicarboxylic acid used as a linking agent.

2. A process for producing a polyester resin for use in a toner binder, which comprises esterifying or transesterifying at a temperature of 180° C. or higher (a) a dihydric alcohol containing from 40 to 90 mol % of an etherified bisphenol, (b) a dicarboxylic acid and/or a dicarboxylic acid anhydride and/or a lower alkyl ester of a dicarboxylic acid, (c) from 3 to 20 mol %, based on the total alcohol component, of a trihydric or polyhydric alcohol, and (d) from 3 to 20 mol %, based on the total acid component, of a tricarboxylic or polycarboxylic acid and/or a tricarboxylic or polycarboxylic acid anhydride and/or a lower alkyl ester of a tricarboxylic or polycarboxylic acid, to obtain a crosslinked low-molecular weight polyester having an acid value of 5 mg KOH/g or less, a number average molecular weight (Mn) of 2,000 or less and a ratio (Mw/Mn) of weight average molecular weight (Mw) to number average molecular weight (Mn) of 2.5 or more, and then reacting the crosslinked low-molecular polyester with a dicarboxylic acid at a temperature of 180° C. or higher.

3. A process for producing a polyester resin for use in a toner binder, which comprises esterifying or transesterifying at a temperature of 180° C. or higher (a) a dihydric alcohol containing from 40 to 90 mol % of an etherified bisphenol, (b) a dicarboxylic acid and/or a dicarboxylic acid anhydride and/or a lower alkyl ester of a dicarboxylic acid, and (c) a trihydric or polyhydric alcohol, or (d) a tricarboxylic or polycarboxylic acid and/or a tricarboxylic or polycarboxylic acid anhydride and/or a lower alkyl ester of a tricarboxylic or polycarboxylic acid, the amount of (c) or (d) being from 6 to 40 mol % based on the total alcohol component or the total acid component, to obtain a crosslinked low-molecular weight polyester having an acid value of 5 mg KOH/g or less, a number average molecular weight (Mn) of 2,000 or less and a ratio (Mw/Mn) of weight average molecular weight (Mw) to number average molecular weight (Mn) of 2.5 or more, and then reacting the crosslinked low-molecular polyester with a dicarboxylic acid at a temperature of 180° C. or higher.

4. A toner characterized in that said polyester for use in the toner binder is mixed with a colorant.

It is advisable that the etherified bisphenol contained in the dihydric alcohol (a) contains on the average from 2.0 to 7.0 mol, per mol of the bisphenol, of oxyethylene or oxypropylene. Examples of this etherified bisphenol include polyoxyethylene [2.2]-2,2-bis(4-hydroxyphenyl)propane in which on the average 2.2 mol of oxyethylene are added to 1 mol of bisphenol A, a substance in which on the average 2.3 mol or 2.4 mol of oxyethylene are added thereto, a substance in which on the average 2.1 mol, 2.3 mol, 2.6 mol or 3.2 mol of oxypropylene are added thereto. In this case, the value in the parentheses [ ] refers to the amount of oxyethylene or oxypropylene added on the average. This is applied to the following description.

The amount of oxyethylene or oxypropylene added is more preferably within the range of from 2.1 to 3.0 mol in order to increase the low-temperature fixability or the stable continuous fixability of the toner.

Further examples of the etherified bisphenol include substituted bisphenols such as polyoxyethylene[2.5]-bis(2,6-dibromo-4-hydroxyphenyl) sulfone, polyoxypropylene[3.0]-2,2-bis (2,5-difluoro-4-hydroxyphenyl)propane, polyoxyethylene [1.5]-polyoxypropylene[1.0]-bis(4-hydroxyphenyl)sulfone and the like.

Examples of the above-mentioned dihydric alcohol (a) include linear aliphatic alcohols such as ethylene glycol, 1,3-propanediol, 1,4-butanediol, diethylene glycol, 2-butene-1,4-diol, 1,5-pentanediol, 1,6-hexanediol, dipropylene glycol, triethylene glycol, tetraethylene glycol, tripropylene glycol, and pentaethylene glycol. Examples of the branched aliphatic alcohol include 1,2-propanediol, 1,2-butanediol, 1,3-butanediol, 2,3-butanediol, neopentyl glycol, 1,2-hexanediol, 2,5-hexanediol, 2-methyl-2,4-pentanediol, 3-methyl-1,5-pentanediol, and 2-ethyl-1,3-hexanediol. Examples of the other diol compound include 1,4-cyclohexanedimethanol, 1,4-dihydroxycyclohexane, hydrogenated bisphenol A, cyclohexylethylene glycol, 1,2-dicyclohexylethylene glycol, pxylylene glycol, and m-xylylene glycol.

The content of the etherified bisphenol contained in the dihydric alcohol is between 40 and 90 mol % based on the total dihydric alcohol component. When the content of the etherified bisphenol is less than 40 mol %, the glass transition temperature of the obtained polyester resin decreases, and the blocking resistance comes to decrease. Meanwhile, when the content of the etherified bisphenol exceeds 90 mol %, the softening point of the obtained polyester resin increases, and the low-temperature fixability comes to deteriorate.

The above-mentioned dicarboxylic acid component (b) include various aliphatic dicarboxylic acids, alicyclic dicarboxylic acids and aromatic dicarboxylic acids. Examples of the aliphatic dicarboxylic acids among these dicarboxylic acids include maleic acid, fumaric acid, citraconic acid, itaconic acid, glutaconic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, and n-octylsuccinic acid. Examples of the alicyclic dicarboxylic acids include 1,4-cyclohexanedicarboxylic acid, and hydrogenated 2,6-naphthalenedicarboxylic acid. Examples of the aromatic dicarboxylic acid include phthalic acid, terephthalic acid, isophthalic acid, 2,6-naphthalenedicarboxylic acid, and 4,4'-methylenedibenzoic acid. Acid anhydrides of these dicarboxylic acids or lower alkyl esters of these dicarboxylic acids are also available. Examples of the lower alkyl group constituting the lower alkyl esters include alkyl groups having from 1 to 4 carbon atoms, such as methyl, ethyl, n-propyl, isopropyl, n-butyl, isobutyl, sec-butyl, and tert-butyl groups. This is the same with the lower alkyl esters to be described hereinafter.

The above-mentioned trihydric or polyhydric alcohol component (c) is preferably a tri- to hexa-hydric alcohol. Examples thereof include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

The above-mentioned tricarboxylic or polycarboxylic acid component (d) is preferably a tri- or tetra-basic carboxylic acid. Examples thereof include 1,2,4-benzenetricarboxylic acid, 1,3,5-benzenetricarboxylic acid, 1,2,4-cyclohexanetricarboxylic acid, 2,5,7-naphthalenetricarboxylic acid, 1,2,4-naphthalenetricarboxylic acid, 1,2,4-butanetricarboxylic acid, pyromellitic acid, 1,2,5-hexanetricarboxylic acid, 1,3-dicarboxy-2-methyl-2-methylenecarboxypropane, tetra (methylenecarboxy)methane, 1,2, 7,8-octanetetracarboxylic acid, and enpol trimer acid. Anhydrides of these tribasic or higher carboxylic acids or lower alkyl esters of these tribasic or higher carboxylic acids are also available.

In the crosslinked low-molecular polyester, both of the trihydric or polyhydric alcohol component and the tricarboxylic or polycarboxylic acid component may be used in combination as copolymerizable components, or one of these two components may be used as a copolymerizable component.

When both of the trihydric or polyhydric alcohol component and the tricarboxylic or polycarboxylic acid component are copolymerized, the amount of the trihydric or polyhydric alcohol component or the tricarboxylic or polycarboxylic acid component is between 3 and 20 mol %, preferably between 5 and 15 mol % based on the total alcohol component or the total acid component constituting the crosslinked low-molecular polyester. When the amount of either the trihydric or higher alcohol component or the tricarboxylic or polycarboxylic acid component is less than 3 mol %, the degree of crosslinking of the crosslinked low-molecular polyester decreases, and the elasticity at the time of melting, therefore, decreases which causes a decrease in the offset resistance. On the contrary, when the amount of either the trihydric or polyhydric alcohol component or the tricarboxylic or polycarboxylic acid component exceeds 20 mol %, the degree of crosslinking of the crosslinked low-molecular polyester becomes too high. The elasticity at the time of melting improves, but the polyester resin formed by linking the crosslinked low-molecular polyester exhibits poor pulverizability, is hard and has a high softening point, thereby impairing the low-temperature fixability.

When one of the trihydric or polyhydric alcohol component and the tricarboxylic or polycarboxylic acid component is copolymerized, the amount of the trihydric or polyhydric alcohol component and the tricarboxylic or polycarboxylic acid component is between 6 and 40 mol %, preferably between 10 and 30 mol % based on the total alcohol component or the total acid component constituting the crosslinked low-molecular polyester. When the amount of the trihydric or higher alcohol component or the tricarboxylic or polycarboxylic acid component is less than 6 mol %, the degree of crosslinking of the crosslinked low-molecular polyester decreases, which causes a decrease in the elasticity at the time of melting and a decrease in the offset resistance. On the contrary, when the amount of the trihydric or higher alcohol component or the tricarboxylic or polycarboxylic acid component exceeds 40 mol %, the degree of crosslinking of the crosslinked low-molecular polyester becomes too high. The elasticity at the time of melting increases, but the polyester resin formed by linking the crosslinked low-molecular polyester exhibits poor pulverizability, is hard and has a high softening point, thereby impairing the low-temperature fixability.

In the polyester resin of the present invention, the offset resistance and the melt flowability can be effectively enhanced by copolymerizing at least one of the trihydric or higher alcohol component and the tricarboxylic or polycarboxylic acid component. This is because the low-molecular polyester is used in the basic structure of the polyester resin of the present invention, so that the trivalent or higher component can be easily introduced without causing gelation and the appropriate crosslinking can be conducted. Consequently, the elasticity at the time of melting can be effectively imparted to the crosslinked low-molecular polyester, improving the offset resistance. Further, since the crosslinked low-molecular polyester becomes a compact substance having a high crosslink density, the entanglement of the molecular chains of the crosslinked substances is decreased, improving the melt flowability.

In the present invention, the acid value of the crosslinked low-molecular polyester has to be 5 mg KOH/g or less; it is preferably 3 mg KOH/g or less. When the acid value exceeds 5 mg KOH/g, the crosslinked low-molecular polyesters are directly linked with each other through the ester linkage in linking the crosslinked polyesters through the dicarboxylic acid, and the crosslinked low-molecular polyesters are hard to exist independently in the molten state. Besides, the flexibility between the crosslinked low-molecular polyesters decreases, and the melt viscosity increases. Accordingly, the obtained polyester resin exhibits poor low-temperature fixability.

In the present invention, the number average molecular weight (Mn) of the crosslinked low-molecular polyester has to be 2,000 or less; it is preferably between 500 and 1,500. When the number average molecular weight (Mn) exceeds 2,000, the melt flowability of the polyester resin for use in the toner binder which is obtained by linking the crosslinked low-molecular polyesters through the dicarboxylic acid notably decreases, and the low-temperature fixability thereof becomes poor.

In the present invention, the ratio of the weight average molecular weight (Mw) to the number average molecular weight (Mn) (Mw/Mn), namely the degree of dispersion has to be 2.5 or more. When the degree of dispersion (Mw/Mn) is less than 2.5, the offset resistance tends to decrease in the properties of the toner using the polyester resin which is obtained by linking the crosslinked low-molecular polyesters through the dicarboxylic acid.

The polyester resin of the present invention is obtained by linking at least a part of the crosslinked low-molecular polyesters through the dicarboxylic acid used as a linking agent. That is, the polyester resin has to contain any higher structure formed by linking a part of the crosslinked low-molecular polyesters. The linking here referred to means linking which is conducted by the condensation reaction between the hydroxyl group in the terminal of the crosslinked low-molecular polyester and both of the carboxyl groups of the dicarboxylic acid.

The content of the dicarboxylic acid used as the linking agent is preferably between 5 and 30 mol parts, more preferably, between 10 and 25 mol parts per 100 mol parts of the total amount of the components constituting the crosslinked low-molecular polyester. When the content of the linking agent is less than 5 mol parts, the linking hardly occurs, and the content of the higher structure obtained by linking the crosslinked low-molecular polyesters decreases. Consequently, the glass transition temperature of the obtained polyester resin decreases, which has an adverse effect on the blocking resistance and the offset resistance. On the contrary, when the content of the linking agent exceeds 30 mol parts, the offset resistance of the obtained polyester resin is greatly improved, but the softening point thereof increases, which has an adverse effect on the low-temperature fixability.

In the polyester resin of the present invention, the acid value is preferably 3 mg KOH/g or less. When the acid value exceeds 3 mg KOH/g, transesterification, decomposition or the like owing to the carboxyl group tends to occur at the time of melting. Therefore, destruction of the higher structure of the polyester resin and a decrease in the melt viscosity thereof are liable to occur, losing the characteristics of the toner using the polyester resin of the present invention in which the toner has offset resistance as well as excellent low-temperature fixability. That is, since the acid value in the present invention is 3 mg KOH/g or less, the decrease in the properties can be reduced in the re-melting step for kneading a colorant, a charge stabilizer and the like when producing the toner. Further, the excellent triboelectric charge stability can be imparted to the toner obtained in spite of the change in the use environment (humidity and temperature). For the above-mentioned reasons, the acid value of the polyester resin in the present invention is 1 mg KOH/g or less, preferably 0.5 mg KOH/g or less.

The number average molecular weight (Mn) of the polyester resin in the present invention is preferably between 5,000 and 20,000. When the number average molecular weight (Mn) is less than 5,000, the content of the high-molecular compound of the polyester resin decreases. The offset resistance, therefore, decreases. Meanwhile, when the number average molecular weight (Mn) exceeds 20,000, the offset resistance becomes good, but the content of the low-molecular compound is low. Therefore, the pulverizability is bad, and the softening point and the temperature at which to start the fixing become high, impairing the low-temperature fixability. For these reasons, the number average molecular weight (Mn) of the polyester resin in the present invention is more preferably 10,000 or less.

The glass transition temperature of the polyester resin in the present invention is preferably between 55° and 75° C. When the glass transition temperature is lower than 55° C., the blocking resistance decreases, making it difficult to provide sufficient storage stability. Meanwhile, when the glass transition temperature exceeds 75° C., the pulverizability of the resin decreases, which has an adverse effect on the fixability. Thus, it is not desirable.

The softening point of the polyester resin in the present invention is preferably between 80° and 160° C. When the softening point is lower than 80° C., the toner particles are liable to collapse, and fine particles tend to be formed and adhered to the surface of the carrier, decreasing the chargeability of the toner particles and also the offset resistance. Meanwhile, when the softening point exceeds 160° C., undesirable phenomena such as the increase in the lowest fixing temperature and the like occur.

The process for producing the polyester resin for use in the toner binder in the present invention will be described below.

First, the crosslinked low-molecular polyester is produced. That is, (a) the dihydric alcohol containing from 40 to 90 mol % of the etherified bisphenol, (b) the dicarboxylic acid and/or the dicarboxylic acid anhydride and/or the lower alkyl ester of the dicarboxylic acid, (c) from 3 to 20 mol %, based on the total alcohol component, of the trihydric or polyhydric alcohol, and (d) from 3 to 20 mol %, based on the total acid component, of the tricarboxylic or polycarboxylic acid and/or the tricarboxylic or polycarboxylic acid anhydride and/or the lower alkyl ester of the tricarboxylic or polycarboxylic acid are mixed at predetermined ratios, and the reaction is conducted at a temperature of 180° C. or higher, preferably from 200° to 260° C. to obtain the crosslinked low-molecular polyester.

In obtaining the crosslinked low-molecular polyester, the proportions of the acid components (b) and (d) and the alcohol components (a) and (c) are important. That is, it is advisable that the charging ratio, namely Q/P wherein P is the total molar amount of the acid components and Q is the total molar amount of the alcohol components be between 1.1 and 3.0. When the charging ratio (Q/P) is larger than 3.0, it is deemed good in that the number average molecular weight (Mn) of the crosslinked low-molecular polyester can be decreased. However, the unreacted alcohol component remains in a large amount. When the trihydric or polyhydric alcohol is used as a constituent, the reaction ratio of the trihydric or higher alcohol tends to decrease. Consequently, the content of the trivalent or higher component decreases as a whole, and it is, therefore, difficult to adjust the degree of dispersion (Mw/Mn) to 2.5 or more, thereby causing a decrease in the offset resistance. Meanwhile, when the charging ratio (Q/P) is between 1.1 and 1.0, the molar balance between the acid component and the alcohol component is close to an equilibrium, and the crosslinked low-molecular polyester becomes a bulky high-molecular structure having a high number average molecular weight (Mn) like an ordinary polyester resin of a single-time addition type. Accordingly, the gelation of the resin abruptly occurs in the polymerization, and the reaction is very hard to control. Further, when the charging ratio (Q/P) is lower than 1.0, a large amount of unreacted carboxyl groups remains within the three-dimensional, bulky molecular network structure, decreasing the triboelectric charge stability of the toner using the polyester resin obtained.

Next, the polyester resin of the present invention can be formed by mixing the resulting crosslinked low-molecular polyesters with the dicarboxylic acid as a linking agent at the above-mentioned ratio, and reacting the mixture at a temperature of 180° C. or higher, preferably between 200° and 260° C. to link the crosslinked low-molecular polyesters through the dicarboxylic acid. In this case, the above-mentioned dicarboxylic acid component (b) is applied as such to the dicarboxylic acid as the linking agent used in the present invention.

An esterification catalyst or a transesterification catalyst which is ordinarily used to accelerate the reaction can be employed when linking the crosslinked low-molecular polyesters. The reaction may be carried out under reduced pressure if required.

The above-mentioned process can produce the polyester resin of the present invention in which the crosslinked low-molecular polyesters are linked through the dicarboxylic acid, and which satisfies the acid value of 3 mg KOH/g or less, the number average molecular weight (Mn) of from 5,000 to 20,000, the glass transition temperature of from 55° to 75° C. and the softening point of from 80° to 160° C. Besides, this process is mainly characterized in that the crosslinked low-molecular polyesters which have been formed are linked through the dicarboxylic acid, unlike conventional methods of producing a polyester resin for use in a toner binder such as a method in which divalent and trivalent or higher functional components are added at a time, a method in which a linear polyester made only of a difunctional component is crosslinked through a trivalent or higher functional component, a method in which a polyester is crosslinked through a compound having a reactive terminal group such as an epoxy group or an isocyanate group, and a method in which a crosslinking reaction is controlled through a monofunctional component. The resulting polyester resin of the present invention does not impair the offset resistance and possesses excellent low-temperature fixability compared to the polyester resins obtained by the conventional methods. Further, it is possible to provide the polyester resin for use in the toner binder which retains excellent properties in terms of triboelectric charge stability, pulverizability and production stability.

A known thermoplastic resin may be added to the polyester resin of the present invention through the mixing or modification within such a range as not to impair the performance as the binder resin, namely within the range of 40% by weight or less, preferably 20% by weight or less of the polyester resin. Examples of this known thermoplastic resin include a polyester resin other than the polyester resin of the present invention, a urethane resin, an epoxy resin, a styrene-acrylic resin, an ethylene-ethyl acrylate resin, a phenolic resin, a styrene-butadiene resin, a xylene resin, and a butyral resin. Among these thermoplastic resins, the styrene-acrylic resin such as a styrene-(meta)acrylic acid ester copolymer or the like is especially preferable.

The toner of the present invention is obtained by mixing the polyester resin of the present invention with a colorant. The toner of the present invention may be produced by using the above-mentioned polyester resin of the present invention as a main component, adding thereto a colorant and an additive if required, mixing them by means of a ball mill, kneading the mixture, pulverizing the resulting mixture and conducting classification. At this time, it is appropriate that the particle diameter of the toner is between 1 and 30 μm, preferably between 5 and 20 μm.

The toner of the present invention can be mixed with a known colorant. Examples of the known colorant include carbon black, nigrosine dyestuff, benzidine yellow, quinacridone, rhodamine B, phthalocyanine blue, aniline blue, chalco oil blue, chrome yellow, ultramarine blue, methylene blue, rose bengale, and mixtures thereof.

A charge control agent, a magnetic substance and the like can be mentioned as additives which are added if required. Agents for improving the properties may be added, for example, a wax as an offset preventer, and a hydrophobic silica as a flowability improver. However, when the polyester resin of the present invention is used as a resin for use in a toner binder, an excellent performance as the binder can be exhibited without adding these agents for improving the properties. When these agents are added, the effects of improvements can be sufficiently achieved even in small amounts thereof.

Examples of the charge control agent include positive charge control agents such as a nigrosine dyestuff, a triphenylmethane dyestuff containing a tertiary amine in the side chain, a quaternary ammonium salt compound, and a polyamine resin; and negative charge control agents such as a metal-containing azo dyestuff, a copper phthalocyanine dyestuff, and a metal complex of alkyl salicylate derivatives. In the addition of the above-mentioned charge control agent, the amount of the charge control agent is between 0.1 and 8.0% by weight, preferably between 0.2 and 5.0% by weight based on the binder resin.

The toner obtained by using the polyester resin of the present invention is mixed with a carrier such as iron powder, ferrite, granular magnetite or the like to form a two-component developer. The amount of the toner is preferably between 0.3 and 20 parts by weight per 100 parts by weight of the carrier. When the toner of the present invention contains a magnetic material, it can be used as a magnetic one-component developer to develop an electrostatic image; when the toner of the present invention does not contain a magnetic material, it can be used as a non-magnetic one-component developer.

In the polyester resin of the present invention, the crosslinked low-molecular polyester having excellent melt flowability is employed as a basic structure, and the overall polyester resin does not have an excessively high molecular weight. Accordingly, the increase in the melt viscosity owing to the entanglement of the molecular chains of the high-molecular compounds is suppressed, and the viscosity is kept low at the time of melting.

In the polyester resin of the present invention, melt elasticity is less decreased even at a relatively high temperature of from approximately 150° to 250° C. Generally, melt elasticity abruptly decreases with the increase in the resin temperature even in the crosslinked polyester. This phenomenon is due largely to the abrupt decrease in the elasticity of the low-molecular component in the molecular weight distribution. However, since the crosslinked low-molecular polyester has the crosslinked structure having a degree of dispersion (Mw/Mn) of 2.5 or more in the polyester resin of the present invention, the polyester resin easily maintains rubber elasticity as a whole, controlling the decrease in elasticity within the relatively high temperature range.

Thus, the toner of the present invention using the polyester resin which can suppress the increase in the melt viscosity and the decrease in the melt elasticity has excellent offset resistance.

Further, in the present invention, since the acid value of the crosslinked low-molecular polyester is 5 mg KOH/g or less, the amount of the remaining carboxyl group in the polyester resin is small. Accordingly, the toner hardly absorbs moisture at a high temperature and a high humidity, considerably suppressing the decrease in the amount of electrostatic charge on the toner at a high humidity. Consequently, in the characteristics of the toner composed of the polyester resin in the present invention, the amount of the charge is scarcely influenced by the use environment (temperature and humidity); the toner of the present invention exhibits excellent triboelectric charge stability. This triboelectric charge stability is more increased by setting the acid value of the polyester resin at 3 mg KOH/g or less.

In the present invention, the polyester resin is formed by linking the crosslinked low-molecular polyesters through the dicarboxylic acid. Accordingly, the increase in the melt viscosity and the decrease in the melt elasticity can be suppressed. Thus, it is possible to provide a toner having excellent offset resistance by using this polyester resin.

In addition, since the polyester resin of the present invention contains an etherified bisphenol as a constituent, the melt flowability can be more improved while maintaining the blocking resistance. As the softening point of the polyester resin in the present invention is decreased, the toner of the present invention can exhibit excellent low-temperature fixability.

On top of that, in the present invention, the acid value of the crosslinked low-molecular polyester is low, and the amount of the remaining carboxyl group in the polyester resin is small, making it possible to retain the excellent triboelectric charge stability of the toner regardless of the use environment. Moreover, the toner of the present invention has itself a small charge amount. Accordingly, the toner of the present invention can be easily used for both positive and negative charge types without adding a large amount of the charge control agent.

EXAMPLES

The present invention will be described specifically by referring to the following examples. However, the present invention is not limited thereto.

The properties of the resin and the properties of the toner obtained by using the resin are evaluated by the following methods.

Acid value (mg KOH/g):

The acid values of the crosslinked low-molecular polyester and the polyester resin were measured by the method prescribed in Japanese Industrial Standards (JIS-K-0070).

Number average molecular weight (Mn) and degree of dispersion (Mw/Mn):

In the present invention, the number average molecular weight (Mn) and the weight average molecular weight (Mw) for the calculation of the degree of dispersion (Mw/Mn) which is the ratio of the weight average molecular weight (Mw) to the number average molecular weight (Mn) were calculated from values measured through gel permeation chromatography. Tetrahydrofuran as a solvent flowed at a flow rate of 1 ml/min and at a temperature of 40° C., and 0.5 ml of a sample solution containing 10 mg/ml of the sample in the tetrahydrofuran was poured to conduct the measurement. A combination of commercial polystyrene gel columns was used to exactly measure the region of the molecular weight of from 1×103 to 2×106. When measuring the molecular weight of the sample, the molecular weight distribution of the sample was calculated from the relationship between the logarithmic value of the calibration curve formed from monodisperse polystyrene standard samples and the count number. An RI (refractive index) detector was used.

Glass transition temperature (° C.):

Using a differential scanning calorimeter (DSC), the measurement was conducted as follows. Ten milligrams of a powdery sample were charged into an aluminum pan. The temperature was elevated from 20° C. to 250° C. at a rate of temperature rise of 10° C./min. The sample was allowed to stand at 250° C. for 5 minutes, and then was cooled to 20° C. at a rate of 10° C./min. Then, the sample was measured at a rate of temperature rise of 10° C./min. The temperature (° C.) at the contact with the tangent which indicates the maximum inclination from the rise portion of the peak to the top of the peak in the DSC thermogram within the glass transition region was defined as a glass transition temperature (hereinafter referred to as "Tg").

Softening point (° C.):

Using a flow tester (CFT-500 model manufactured by Shimadzu Corporation), the softening point was measured under such conditions that a load was 20 kg/cm2, a nozzle having a size of 1 mm (diameter)×10 mm was used, a preheating was conducted at 80° C. for 5 minutes, a rate of temperature rise was 3° C./min and an amount of a sample was 1.5 g. A temperature (° C.) at which h/2 was reached wherein h is a height of a S-shaped curve in a plunger-descending-amount-temperature curve (softening flow curve) of the flow tester was defined as a softening point.

Pulverizability of a resin:

After the completion of an ordinary pulverization step, the resin was passed through a sieve to obtain resin powder which was passed through a 16-mesh sieve but not through a 20-mesh sieve. Thirty grams (W1) of the thus-classified resin powder were accurately weighed, pulverized for 15 minutes by means of a coffee mill (HR-2170, manufactured by Philips), and then passed through a 32-mesh sieve. The weight W2 (g) of the resin which was not passed therethrough was accurately weighed, and the residual rate (%) was calculated according to the following expression.

Residual rate (%)=W2(g)/W1(g)×100

The above-mentioned procedure was repeated three times, and the evaluation was conducted according to the following scoring system.

⊚: The average residual rate was between 0 and 15.0%.

○: The average residual rate was between 15.1 and 30.0%.

Δ: The average residual rate was between 30.1 and 45.0%.

×: The average residual rate was between 45.1 and 100%.

Blocking resistance:

The toner was allowed to stand at a temperature of 50° C. and a relative humidity of 40% for 48 hours. At this time, the extent of occurrence of agglomeration was observed, and the evaluation was according to the following scoring system.

○: No agglomerate was observed.

Δ: An agglomerate was slightly observed.

×: An agglomerate was considerably observed.

Temperature (° C.) at which offset occurs:

Four parts of an electrophotographic toner obtained in each of Examples and Comparative Examples were mixed with 96 parts of a ferrite carrier having no resin coating (FL-1530, made by Powder Tech) to form a two-component developer. Using this developer, belt-like unfixed images each of which was 2 cm long and 5 cm broad were formed on an A4 transfer paper by means of a commercial copier (BD-9110, manufactured by Toshiba Corp.). Then, a fixing machine in which a pair of heat rollers having a surface layer made of teflon (trade name for polytetrafluoroethylene: registered trademark) and a pressure fixing roller having a surface layer made of a silicone rubber were rotated was adjusted such that the roller pressure was 1 kg/cm2 and the speed of the roller was 200 mm/sec. The surface temperature of the heat roller was increased stepwise, and belt-like images each of which was 2 cm long and 5 cm broad were transferred onto a A4 transfer paper. It was observed whether or not a blank portion of the transfer paper was stained owing to the offset. The lowest surface temperature of the thermal fixing roller given when the offset occurred was defined as a temperature (° C.) at which the offset occurred, and the offset resistance was evaluated.

Lowest fixing temperature (° C.):

The fixed images formed by means of the above-mentioned fixing machine were rubbed using an edge of a sand eraser 15 mm broad to which 1 kg of a load was applied, and a fixing ratio was calculated according to the following expression. The temperature (° C.) of the fixing roller given when the fixing ratio exceeded 70% was defined as the lowest fixing temperature. The Image density was measured using a refractive densitometer (RD-914, manufactured by Macbeth).

Fixing ratio (%)=

[Image density of a fixed image after rubbed/image density of a fixed image before rubbed]×100

Dependence of triboelectric charge amount on humidity:

The triboelectric charge amount (μC/g) of the above-mentioned developer in the low-humidity atmosphere (temperature 10° C., relative humidity 20%) and the high-humidity atmosphere (temperature 33° C., relative humidity 80%) were measured by a blow-off method. Using the absolute value of the difference between the triboelectric charge amounts as a value of a change in the triboelectric charge amount (μC/g), the dependence of the triboelectric charge amount on the humidity was evaluated. The smaller the value is, the lower the dependence on the humidity becomes, and the toner is evaluated as good. The triboelectric charge amount in the rubbing was measured by allowing the toner to stand in each atmosphere for 16 hours, and then mixing it with the ferrite carrier while stirring them. A blow-off rubbing triboelectric charge amount measuring device (manufactured by Toshiba Chemical) was used to measure the triboelectric charge amount.

Initial image density:

A copying test was conducted using the above-mentioned developer and copier (the surface temperature of the heat roller was set at 170° C.), and the initial image density was measured. The image density was measured by means of a refractive densitometer (RD-914, manufactured by Macbeth).

EXAMPLE 1

Production of a crosslinked low-molecular weight polyester:

According to a formulation of a crosslinked low-molecular polyester shown in Table 1, isophthalic acid and trimellitic anhydride as acid components, and 1,4-cyclohexanedimethanol and polyoxyethylene [2.2]-2,2-bis (4-hydroxyphenyl)propane as alcohol components were charged into a reactor fitted with a thermometer, a stainless steel stirrer and a falling-type condenser, and the mixture was reacted under nitrogen at an inner temperature of 220° C. and a stirring-rotational number of 200 rpm. The reaction was conducted for approximately 5 hours from the time when the esterification was started and the discharging of water from the reaction system was started to the time when the discharging of water was completed. The resulting product had the acid value of 2.2 mg KOH/g, the number average molecular weight (Mn) of 1,100, and the degree of dispersion (Mw/Mn) of 3.0. It was confirmed that the product was a crosslinked low-molecular weight polyester. No ingredient other than water was detected in the NMR analysis of the discharged solution. From this fact, it was presumed that no low-boiling by-product was formed in the transesterification reaction.

Production of a polyester resin:

Isophthalic acid in an amount shown in Table 1 was added as a linking agent to the reaction system in which the above-mentioned crosslinked low-molecular polyesters were formed, and the crosslinked low-molecular polyesters were linked at an inner temperature of 220° C. and a stirring-rotational number of 200 rpm. The reaction was conducted for approximately 3 hours from the time when the esterification was started and the discharging of water from the reaction system was started to the time when the discharging of water was completed. At this time, the stirring torque meter indicated 0 kg-cm. Subsequently, the pressure inside the reaction system was reduced to 10 torr or less, and the reaction was further continued. After approximately 1.5 hours from the start of the pressure reduction, the melt viscosity of the reaction system was gradually raised. Then, the stirring torque was continuously raised, and reached 3.6 kg-cm after approximately 3 hours from the start of the pressure reduction. Thereafter, the stirring torque was observed for approximately 1 hour while maintaining the stirring-rotational number at 200 rpm. As a result, the stirring torque was approximately 3.5 kg-cm, and it was constant. Therefore, the reaction was terminated at this point. The product was discharged in a usual manner to obtain a polyester resin A1. No ingredient other than water was detected in the NMR analysis of the discharged solution. From this fact, it was presumed that no low-boiling by-product was formed in the transesterification reaction. The properties of the obtained polyester resin A1 are shown in Table 1.

EXAMPLE 2 to 8

Polyester resins A2 to A8 were obtained in the same manner as in Example 1 using terephthalic acid, isophthalic acid, 1,4-cyclohexanedicarboxylic acid and trimellitic anhydride as acid components, polyoxypropylene[2.2]-2,2-bis(4-hydroxyphenyl) propane, polyoxyethylene[2.2]-2,2-bis(4-hydroxyphenyl) propane, 1,4-cyclohexanedimethanol, hydrogenated bisphenol A and trimethylolpropane as alcohol components, and isophthalic acid and succinic anhydride as linking agents. The formulation, the properties of the crosslinked low-molecular polyesters and the properties of the resulting polyester resins (A2 to A8) are shown in Table 1.

TABLE 1

| Example No. | Resin No. | Formulation: Crosslinked low-molecular polyester (mol %) — Acid component: TPA | IPA | CHDA | TMA | Alcohol component: BP | BE | CHDM | HB | TMP | linking agent *1): IPA | SUA |
|---|---|---|---|---|---|---|---|---|---|---|---|---|
| 1 | A1 | — | 31 | — | 9 | — | 42 | 18 | — | — | 15 | — |
| 2 | A2 | 40 | — | — | — | — | 24 | 27 | — | 9 | 10 | 5 |
| 3 | A3 | — | 35 | 5 | — | — | 37 | — | 8 | 15 | 15 | — |
| 4 | A4 | 16 | 24 | — | — | 12 | 30 | 11 | — | 7 | 20 | — |
| 5 | A5 | — | 27 | — | 13 | — | 30 | 30 | — | — | 15 | — |
| 6 | A6 | — | 37 | — | 3 | — | 38 | 16 | — | 6 | 15 | — |
| 7 | A7 | — | 37 | — | 3 | — | 24 | 30 | — | 6 | 10 | 5 |
| 8 | A8 | 35 | — | — | 3 | — | 46 | — | 8 | 6 | 10 | — |

| Example No. | Resin No. | Properties of the crosslinked low-molecular polyester: Acid value mg KOH/g | Number average molecular weight Mn | Degree of dispersion Mw/Mn | Properties of the polyester resin: Acid value mg KOH/g | Number average molecular weight Mn | Tg °C. | Softening point °C. |
|---|---|---|---|---|---|---|---|---|
| 1 | A1 | 2.2 | 1100 | 3.0 | 1.3 | 6900 | 62 | 137 |
| 2 | A2 | 1.9 | 1200 | 3.0 | 0.9 | 7800 | 61 | 134 |
| 3 | A3 | 1.8 | 1200 | 3.7 | 1.0 | 6300 | 63 | 132 |
| 4 | A4 | 1.9 | 1800 | 2.8 | 0.6 | 7200 | 62 | 127 |
| 5 | A5 | 2.4 | 1300 | 4.6 | 1.0 | 6800 | 61 | 141 |
| 6 | A6 | 2.4 | 1100 | 3.0 | 2.0 | 6900 | 62 | 135 |
| 7 | A7 | 1.9 | 1100 | 3.1 | 1.5 | 6800 | 63 | 132 |
| 8 | A8 | 2.2 | 1000 | 3.1 | 2.2 | 6300 | 60 | 130 |

*1) mol parts per 100 mol parts of all components constituting the crosslinked low-molecular polyester TPA: terephthalic acid IPA: isophthalic acid CHDA: 1,4-cyclohexanedicarboxylic acid TMA: trimellitic anhydride SUA: succinic anhydride BP: polyoxypropylene[2.2]-2,2-bis(4-hydroxyphenyl)propane BE: polyoxyethylene[2.2]-2,2-bis(4-hydroxyphenyl)propane CHDM: 1,4-cyclohexanedimethanol HB: hydrogenated bisphenol A TMP: trimethylolpropane Comparative Example 1

The same components as those used in Example 1 were charged into the same reactor as that used in Example 1 at a time, and the mixture was reacted under nitrogen at an inner temperature of 220° C. and a stirring-rotational number of 200 rpm. The reaction was conducted for approximately 6 hours from the time when the esterification was started and the discharging of water from the reaction system was started to the time when the discharging of water was terminated. At this point, the stirring torque meter indicated 0 kg-cm. Subsequently, the pressure within the reaction system was reduced to 10 torr or less, and the reaction was further continued. After approximately 3 hours from the start of the pressure reduction, the melt viscosity of the reaction system was gradually raised. Then, the stirring torque was continuously increased. After approximately 6 hours from the start of the pressure reduction, the stirring torque reached 3.0 kg-cm. At this point, the pressure within the reaction system was returned to the atmospheric pressure, and the stirring-rotational number was kept at 200 rpm. Thus, the stirring torque was observed. As a result, the stirring torque was further abruptly increased continuously. After approximately 15 minutes, the polymer gelled, and it was impossible to discharge the polymer in a usual manner.

Therefore, in the above-mentioned reaction step, when the stirring torque reached 3.0 kg-cm after approximately 6 hours from the start of the pressure reduction, the pressure within the reaction system was returned to the atmospheric pressure, and the stirring-rotational number was kept at 200 rpm. At this state, the reaction was completed when the stirring torque reached 3.5 kg-cm. The product was then discharged in a usual manner to obtain a polyester resin B1. This polyester resin was a pale yellow solid. The properties of the resulting polyester resin B1 are shown in Table 2.

Comparative Example 2

Among the same components as those used in Example 1, isophthalic acid as an acid component and 1,4-cyclohexanedimethanol and polyoxyethylene[2.2]-2,2-bis (4-hydroxyphenyl) propane as alcohol components were charged into the same reactor as that used in Example 1, and the mixture was reacted under nitrogen at an inner temperature of 220° C. and a stirring rotational number of 200 rpm. The reaction was conducted for approximately 4 hours from the time when the esterification was started and the discharging of water from the reaction system was started to the time when the discharging of water was terminated. Subsequently, when trimellitic anhydride was then added to the reaction system, the discharging of water from the reaction system was restarted, and the reaction was further conducted for approximately 3 hours until the discharging of water was completed. At this time, the stirring torque meter indicated 0 kg-cm. Then, the pressure within the reaction system was reduced to 10 torr or less, and the reaction was further continued. After approximately 2.5 hours from the start of the pressure reduction, the melt viscosity of the reaction system was gradually raised. Thereafter, the stirring torque was continuously raised, and reached 3.0 kg-cm after approximately 5 hours from the start of the pressure reduction. At this point, the pressure within the reaction system was returned to the atmospheric pressure, and the stirring rotational number was kept at 200 rpm. At this state, the stirring torque was observed. As a result, the stirring torque was further abruptly raised continuously. After approximately 50 minutes, the stirring torque became approximately 3.5 kg-cm. After approximately 60 minutes, the polymer gelled, and could not be discharged in a usual manner.

Therefore, in the above reaction step, the stirring-rotational number was kept at 200 rpm. At this time, when the stirring torque reached 3.5 kg-cm, the reaction was terminated. The product was discharged in a usual manner to obtain a polyester resin B2. This polyester resin was a pale yellow solid. The properties of the thus-obtained polyester B2 are shown in Table 2.

TABLE 2

| | | Formulation Crosslinked low-molecular polyester (mol %) | | | | | | | | | Properties of the polyester resin | | | |
|---|---|---|---|---|---|---|---|---|---|---|---|---|---|---|
| | | Acid component | | | | Alcohol component | | | | | | | | |
| CEx. No. | Resin No. | TPA | IPA | CHDA | TMA | BP | BE | CHDM | HB | TMP | Acid value mg KOH/g | Number average molecular weight Mn | Tg °C. | Softening point °C. |
| 1 | B1 | — | 40 | — | 7 | — | 37 | 16 | — | — | 7.5 | 7200 | 65 | 163 |
| 2 | B2 | — | 40 | — | 7 | — | 37 | 16 | — | — | 6.9 | 7200 | 64 | 162 |

CEx.—Comparative Example
TPA: terephthalic acid
IPA: isophthalic acid
CHDA: 1,4-cyclohexanedicarboxylic acid
TMA: trimellitic anhydride
SUA: succinic anhydride
BP: polyoxypropylene[2.2]-2,2-bis(4-hydroxyphenyl)propane
BE: polyoxyethylene[2.2]-2,2-bis(4-hydroxyphenyl)propane
CHDM: 1,4-cyclohexanedimethanol
HB: hydrogenated bisphenol A
TMP: trimethylolpropane Comparative Examples 3 to 8

Polyester resins B3 to B8 were produced in the same manner as in Example 1 using terephthalic acid, isophthalic acid and trimellitic anhydride as acid components, polyoxypropylene[2.2]-2,2-bis(4-hydroxyphenyl)propane, polyoxyethylene[2.2]-2,2-bis(4-hydroxyphenyl)propane, 1,4-cyclohexanedimethanol, hydrogenated bisphenol A and trimethylolpropane as alcohol components, and isophthalic acid and succinic anhydride as linking agents. The formulation, the properties of the crosslinked low-molecular polyesters and the properties of the obtained polyester resins (B3 to B8) are shown in Table 3.

TABLE 3

| CEx. No. | Resin No. | Formulation: Crosslinked low-molecular polyester (mol %) — Acid component: TPA | IPA | CHDA | TMA | Alcohol component: BP | BE | CHDM | HB | TMP | linking agent #1): IPA | SUA |
|---|---|---|---|---|---|---|---|---|---|---|---|---|
| 3 | B3 | — | 31 | — | 9 | — | 44 | 12 | 4 | — | — | — |
| 4 | B4 | 20 | 18 | — | 2 | — | 45 | 15 | — | — | — | 35 |
| 5 | B5 | — | 40 | — | — | 15 | 7 | 8 | — | 30 | 9 | — |
| 6 | B6 | — | 31 | — | 9 | — | 42 | 18 | — | — | 15 | — |
| 7 | B7 | 19 | 20 | — | 1 | — | 50 | 8 | — | 2 | 20 | — |
| 8 | B8 | — | 28 | — | 12 | — | 42 | 14 | — | 4 | 15 | — |

| CEx. No. | Resin No. | Properties of the crosslinked low-molecular polyester: Acid value mg KOH/g | Number average molecular weight Mn | Degree of dispersion Mw/Mn | Properties of the polyester resin: Acid value mg KOH/g | Number average molecular weight Mn | Tg °C. | Softening point °C. |
|---|---|---|---|---|---|---|---|---|
| 3 | B3 | 2.0 | 1100 | 3.0 | 1.0 | 1500 | 44 | 106 |
| 4 | B4 | 1.8 | 2500 | 2.2 | 0.6 | 18500 | 62 | 118 |
| 5 | B5 | 2.5 | 1300 | 5.8 | 3.0 | 6300 | 63 | 172 |
| 6 | B6 | 7.0 | 800 | 1.8 | 1.5 | 7700 | 60 | 163 |
| 7 | B7 | 0.9 | 2300 | 2.3 | 0.9 | 17500 | 63 | 165 |
| 8 | B8 | 6.2 | 1200 | 4.2 | 1.1 | 8500 | 65 | 168 |

CEx.—Comparative Example
*1) mol parts per 100 mol parts of all components constituting the crosslinked low-molecular polyester
TPA: terephthalic acid
IPA: isophthalic acid
CHDA: 1,4-cyclohexanedicarboxylic acid
TMA: trimellitic anhydride
SUA: succinic anhydride
BP: polyoxypropylene[2.2]-2,2-bis(4-hydroxyphenyl)propane
BE: polyoxyethylene[2.2]-2,2-bis(4-hydroxyphenyl)propane
CHDM: 1,4-cyclohexanedimethanol
HB: hydrogenated bisphenol A
TMP: trimethylolpropane Production of toner:

Toners were produced using the polyester resins A1 to A8 and B1 to B8 obtained in the above-mentioned examples and comparative examples. That is, the following materials were mixed by means of a super mixer, melt-kneaded by means of a twin-screw extruder, cooled, then milled by means of a hummer mill, and further pulverized by means of a jet mill. The particle diameters of the particles were adjusted by means of a classification device to obtain a toner in which a particle diameter of 50% particles calculated through a Coulter counter TA-II model based on a volume was 11 μm. The pulverizability of the resin at this time is shown in Table 4.

polyester resin: 100 parts carbon black (MA-100, made by Mitsubishi Chemical

Industries Ltd.): 6.5 parts chrome-containing metal dyestuff (S-34, made by Orient Kagaku Kogyo K. K.): 2 parts polypropylene (Biscoal 330P, made by Sanyo Chemical Industries, Ltd.): 2 parts Evaluation of the properties of the toner:

A ferrite carrier (96 parts by weight) was added to 4 parts by weight of the above-obtained toner to form a developer. The properties of the toner were evaluated using this developer. The results of the evaluation are shown in Table 4.

TABLE 4

| Ex. No. | Resin No. | Properties of resin Pulverizability | Properties of the toner: Blocking resistance | Offset occurrence temperature °C. | Lowest fixing temperature °C. | Change in triboelectric charge amount | Initial image density |
|---|---|---|---|---|---|---|---|
| 1 | A1 | ◎ | ○ | 230 or more | 130 | 1 | 1.34 |
| 2 | A2 | ◎ | ○ | 230 or more | 128 | 1 | 1.33 |
| 3 | A3 | ◎ | ○ | 230 or more | 129 | 1 | 1.33 |
| 4 | A4 | ◎ | ○ | 230 or more | 128 | 1 | 1.34 |
| 5 | A5 | ◎ | ○ | 230 or more | 130 | 1 | 1.33 |
| 6 | A6 | ◎ | ○ | 230 or more | 130 | 1 | 1.32 |
| 7 | A7 | ◎ | ○ | 230 or more | 128 | 1 | 1.35 |
| 8 | A8 | ◎ | ○ | 230 or more | 128 | 2 | 1.32 |

TABLE 4-continued

| | Resin No. | Properties of resin Pulverizability | Properties of the toner Blocking resistance | Offset occurrence temperature °C. | Lowest fixing temperature °C. | Change in triboelectric charge amount | Initial image density |
|---|---|---|---|---|---|---|---|
| CEx. No. | | | | | | | |
| 1 | B1 | Δ | ○ | 230 or more | 157 | 8 | 1.29 |
| 2 | B2 | ○ | ○ | 230 or more | 156 | 5 | 1.30 |
| 3 | B3 | X | X | 140 | 107 | 1 | 1.32 |
| 4 | B4 | X | ○ | 125 | 105 | 1 | 1.33 |
| 5 | B5 | X | ○ | 230 or more | 172 | 1 | 1.00 |
| 6 | B6 | Δ | ○ | 230 or more | 154 | 1 | 1.28 |
| 7 | B7 | X | ○ | 230 or more | 165 | 1 | 1.00 |
| 8 | B8 | X | ○ | 230 or more | 160 | 1 | 1.24 |

Ex.—Example
CEx.—Comparative Example

As is clear from the results in Table 4, the toners using the polyester resins A1 to A8 in the present invention exhibited the excellent properties in terms of the blocking resistance, low-temperature fixability, offset resistance, environmental dependence of the triboelectric charge and initial image density. These toners were capable of forming excellent images stably at high speed regardless of the environmental conditions.

Meanwhile, in the toners using the polyester resins B1 and B2 which are outside the scope of the present invention, the components were charged at a time in producing the polyester resins, making it substantially impossible to control the crosslinking reaction. Further, when the reaction was appropriately terminated, it was very hard to control the reaction to a desired degree of crosslinking with good reproducibility. In addition, since the carboxyl group remained in the polyester resins B1 and B2, the resulting toners exhibited the poor triboelectric charge stability, and provided the bulky molecular structure. The softening points of the resins were increased, so that the low-temperature fixability became poor.

In the toner using the polyester resin B3 which is outside the scope of the present invention, the polyester resin B3 was obtained by polymerizing the crosslinked low-molecular polyester under reduced pressure without the linking reaction through the linking agent, and most of the compounds in the molecular weight distribution were low-molecular compounds. Accordingly, the low-temperature fixability was excellent, but fine particles were easily formed in the pulverization of the resin, and the blocking resistance and the offset resistance were also poor.

In the toner using the polyester resin B4 which is outside the scope of the present invention, since the content of the polyvalent component in the polyester resin B4 was low, the degree of dispersion of the crosslinked low-molecular polyester was reduced, and the content of the higher structure in the resin was decreased. Therefore, the toner exhibited poor offset resistance. Moreover, since the molecular weight of the crosslinked low-molecular polyester was high and the content of the linking agent was high, the polyester resin B4 came to be of a high molecular weight, reducing the pulverizability.

In the toner using the polyester resin B5 which is outside the scope of the present invention, the content of the polyvalent component in the polyester resin B5 was high, with the result that the content of the higher structure in the resin was increased. Since the softening point of the resin became high, the toner exhibited poor pulverizability and poor low-temperature fixability.

In the toner using the polyester resin B6 which is outside the scope of the present invention, the acid value of the crosslinked low-molecular polyester was not sufficiently low. Accordingly, in the subsequent linking reaction step, the crosslinked low-molecular polyesters were directly linked with each other very often. Consequently, the resulting polyester resin B6 had the bulky structure close to the polyester resin B1. Therefore, the resin exhibited the poor pulverizability, and the toner using the same exhibited poor low-temperature fixability.

In the toner using the polyester resin B7 which is outside the scope of the present invention, the degree of dispersion of the crosslinked low-molecular polyester was low. Accordingly, the polyester resin B7 obtained by the linking through the dicarboxylic acid became a less crosslinked high-molecular substance. Therefore, the pulverizability was poor. Further, since the softening point was increased, the toner using the same was very poor in terms of low-temperature fixability.

In the toner using the polyester resin B8 which is outside the scope of the present invention, the amount of the crosslinkable substance was high, the acid value of the crosslinked low-molecular polyester was high, and the softening point of the obtained polyester resin B8 was increased. Accordingly, the pulverizability of the resin was poor, and the toner using the same was very poor in terms of low-temperature fixability.

We claim:

1. A polyester resin for use in a toner binder, characterized in that at least a part of a crosslinked low-molecular polyester having an acid value of 5 mg KOH/g or less, a number average molecular weight (Mn) of 2,000 or less and a ratio of weight average molecular weight (Mw) to number average molecular weight (Mn) (Mw/Mn) of 2.5 or more is linked through a dicarboxylic acid used as a linking agent.

2. The polyester resin for use in the toner binder as mentioned in claim 1, which is obtained by copolymerizing (a) a dihydric alcohol containing from 40 to 90 mol % of an etherified bisphenol, (b) a dicarboxylic acid and/or a dibasic carboxylic acid anhydride and/or a lower alkyl ester of a dicarboxylic acid, (c) from 3 to 20 mol %, based on the total alcohol component, of a trihydric or polyhydric alcohol, and (d) from 3 to 20 mol %, based on the total acid component, of a tricarboxylic or polycarboxylic acid and/or a tricarboxylic or polycarboxylic acid anhydride and/or a lower alkyl ester of a tricarboxylic or polycarboxylic acid.

3. The polyester resin for use in the toner binder as mentioned in claim 1, which is obtained by copolymerizing (a) a dihydric alcohol containing from 40 to 90 mol % of an etherified bisphenol, (b) a dicarboxylic acid and/or a dibasic carboxylic acid anhydride and/or a lower alkyl ester of a dicarboxylic acid, and (c) a trihydric or polyhydric alcohol, or (d) a tricarboxylic or polycarboxylic acid and/or a tricarboxylic or polycarboxylic acid anhydride and/or a lower alkyl ester of a tricarboxylic or polycarboxylic acid, the amount of (c) or (d) being from 6 to 40 mol % based on the total alcohol component or the total acid component.

4. The polyester resin for use in the toner binder as mentioned in any one of claims 1 to 3, wherein the etherified bisphenol is a compound formed by adding from 2.0 to 7.0 mol of oxyethylene or oxypropylene to 1 mol of bisphenol A.

5. The polyester resin for use in the toner binder as mentioned in any one of claims 1 to 3, wherein the etherified bisphenol is a compound formed by adding from 2.1 to 3.0 mol of oxyethylene or oxypropylene to 1 mol of bisphenol A.

6. The polyester resin for use in the toner binder as mentioned in any one of claims 1 to 5, wherein the acid value is 3 mg KOH/g or less, and the number average molecular weight (Mn) is between 5,000 and 20,000.

7. The polyester resin for use in the toner binder as mentioned in any one of claims 1 to 6, wherein the glass transition temperature is between 55° and 75° C., and the softening point is between 80° and 160° C.

8. The polyester resin for use in the toner binder as mentioned in any one of claims 1 to 7, wherein the amount of the dicarboxylic acid used as the linking agent is between 5 and 30 mol parts per 100 mol parts of all the components constituting the crosslinked low-molecular polyester.

9. A process for producing a polyester resin for use in a toner binder, which comprises esterifying or transesterifying at a temperature of 180° C. or higher (a) a dihydric alcohol containing from 40 to 90 mol % of an etherified bisphenol, (b) a dicarboxylic acid and/or a dicarboxylic acid anhydride and/or a lower alkyl ester of a dicarboxylic acid, (c) from 3 to 20 mol %, based on the total alcohol component, of a trihydric or polyhydric alcohol, and (d) from 3 to 20 mol %, based on the total acid component, of a tricarboxylic or polycarboxylic acid and/or a tricarboxylic or polycarboxylic acid anhydride and/or a lower alkyl ester of a tricarboxylic or polycarboxylic acid, to obtain a crosslinked low-molecular weight polyester having an acid value of 5 mg KOH/g or less, a number average molecular weight (Mn) of 2,000 or less and a ratio of weight average molecular weight (Mw) to number average molecular weight (Mn) (Mw/Mn) of 2.5 or more, and then reacting the crosslinked low-molecular polyester with a dicarboxylic acid at a temperature of 180° C. or higher.

10. A process for producing a polyester resin for use in a toner binder, which comprises esterifying or transesterifying at a temperature of 180° C. or higher (a) a dihydric alcohol containing from 40 to 90 mol % of an etherified bisphenol, (b) a dicarboxylic acid and/or a dicarboxylic acid anhydride and/or a lower alkyl ester of a dicarboxylic acid, and (c) a trihydric or polyhydric alcohol, or (d) a tricarboxylic acid and/or a tricarboxylic or polycarboxylic acid anhydride and/or a lower alkyl ester of a tricarboxylic or polycarboxylic acid, the amount of (c) or (d) being from 6 to 40 mol % based on the total alcohol component or the total acid component, to obtain a crosslinked low-molecular weight polyester having an acid value of 5 mg KOH/g or less, a number average molecular weight (Mn) of 2,000 or less and a ratio of weight average molecular weight (Mw) to number average molecular weight (Mn) (Mw/Mn) of 2.5 or more, and then reacting the crosslinked low-molecular polyester with a dicarboxylic acid at a temperature of 180° C. or higher.

* * * * *